United States Patent [19]
Lucente et al.

[11] Patent Number: 5,287,245
[45] Date of Patent: Feb. 15, 1994

[54] COMPUTER HAVING EJECTABLE KEYBOARD EJECTED BY DAMPING DEVICE

[75] Inventors: Samuel A. M. Lucente, Stamford, Conn.; Richard F. Sapper, Milan, Italy; Atsuhisa Naitoh, Ebina, Japan; Seita Horikoshi, Zama, Japan; Mikio Kurihara, Yokohama, Japan; Kazuhide Yoshihara, Machida, Japan

[73] Assignee: International Business Machines Corporation, Armonk, N.Y.

[21] Appl. No.: 975,845

[22] Filed: Nov. 13, 1992

[51] Int. Cl.⁵ .......................... H05K 7/14; G06F 1/16
[52] U.S. Cl. .................................... 361/680; 361/727; 292/163; 292/181; 312/319.1; 400/682; 345/168
[58] Field of Search ............... 312/223.2, 223.3, 208.1, 312/333, 319.1; 292/175, 181, 177, 163, DIG. 17; 400/682; 340/711; 361/344, 380, 390-395, 399, 679-687, 724-727; 200/50 A, 50 AA; 364/708, 708.1

[56] References Cited
U.S. PATENT DOCUMENTS 4,600,255  7/1986  Dubarko ........................ 312/333
4,709,972  12/1987  LaBudde et al. ............... 361/391 X Primary Examiner—Gerald P. Tolin
Assistant Examiner—Michael W. Phillips
Attorney, Agent, or Firm—Calfee Halter & Griswold

[57] ABSTRACT

A keyboard storage and retrieval system for a computer is provided, the system comprising a flat panel display, an enclosure, a removable keyboard slidably attached to the enclosure, and a latching system for lockingly securing the removable keyboard to the enclosure. The latching system includes a manually operated damping device for ejecting the removable keyboard from the enclosure and a manually operated mechanical latching device for securing the removable keyboard to the enclosure. The flat panel display is movable to a closed position on the enclosure to actuate the latching device to prevent the damping device from ejecting the removable keyboard from the enclosure.

25 Claims, 5 Drawing Sheets

COMPUTER HAVING EJECTABLE KEYBOARD EJECTED BY DAMPING DEVICE

TECHNICAL FIELD

The present invention relates generally to computers and more specifically to a keyboard storage and retrieval system for a computer having a removable keyboard.

BACKGROUND OF THE INVENTION

Laptop computers continue to increase in popularity due at least in part to a corresponding increase in performance levels as well as affordability. The performance of some high-level laptop computers, has increased to approach that of similar stand-alone non-portable (desktop) personal computers. Laptop computers are available with a variety of storage, input/output (I/O) and expansion options to meet various user needs. Laptop computers generally offer the availability of floppy as well as hard disk drives, and operate using a variety of types of microprocessors.

Laptop computers typically include a flat panel display such as a liquid crystal display (LCD) screen by which the computer displays information (data as well as graphics). On many laptop computer designs, the flat panel display is attached to the computer enclosure by a hinge, and flips upwardly away from the enclosure to reveal the display to a user of the laptop computer. The flat panel display is typically powered by stored charge provided by one or more batteries.

The manner in which a user interacts with a laptop computer is by either by means of a stylus which is used to write on the display or by means of a keyboard. In stylus or pen-based systems, the laptop computer is capable of recognizing handwritten instructions provided by the user. The stylus or pen may be wireless or may be attached to the computer by a cable.

Keyboards are also utilized by users to interact with laptop computers. In stylus or pen-based systems, a keyboard is often optional. In other laptop computers, the keyboard is required. The keyboard in a laptop computer system may either be fixedly attached to the computer enclosure or it may be removable from the enclosure. Fixed position keyboards present design constraints because the keyboard must be physically located in front of the flat panel display. Fixed position keyboards also do not offer the option for the user to adjust the position of the keyboard with respect to the flat panel display. In pen-based systems, the fixed position keyboard may obstruct the access of a user when operating a stylus on the display.

Removable keyboards need not be physically located in front of the flat panel display, thereby eliminating the position of the keyboard as a design constraint for the laptop computer. Moreover, a user may adjust the position of the keyboard with respect to the display, thereby providing a more ergonomically usable laptop computer. Removable keyboards may be connected by cable to the laptop computer or they may be completely detachable from the computer. Completely detachable keyboards typically communicate with the laptop computer via infrared signals.

Removable keyboards for laptop computers, however, may be accidentally separated from the computer when not in use by the user. Accordingly, it is believed that there is a need for an improved keyboard storage and retrieval system for a laptop computer having a removable keyboard. The need extends to desktop computers which have removable keyboards. It is an object of the present invention, therefore, to provide such a keyboard storage and retrieval system.

SUMMARY OF THE INVENTION

According to the present invention, a keyboard storage and retrieval system is provided for a computer having a removable keyboard. The invention may be implemented in either laptop or desktop computers. The invention may also be implemented in either pen-based and non pen-based systems. In pen-based systems, the removable keyboard may be completely stored out of the way of the flat panel display, thereby presenting the user operating a stylus with easier access to the display.

The keyboard storage and retrieval system is incorporated into a computer tilt-stand or enclosure and comprises a manually operated damping device and a manually operated mechanical latching device. The damping device is used to eject the removable keyboard from the enclosure. The latching device is used to secure the removable keyboard to the enclosure. The damping device comprises a cylinder, a piston rod contained within and extendable from the cylinder, and an offset piston rod extension. The piston rod extension is offset with respect to the piston so as to contact an edge of the removable keyboard. In this manner, the piston rod is able to eject the removable keyboard from the enclosure when the piston rod is fully extended.

When the flat panel display is in a closed position on the enclosure or tilt-stand, the latching device prevents the damping device from ejecting the keyboard from the enclosure. A locking pin extending from the latching device mates with a recess in the keyboard to prevent ejection of the keyboard, thereby effectively locking the keyboard to the enclosure. When the flat panel display is in a open position, however, the damping device is not inhibited from ejecting the removable keyboard from the enclosure. The locking pin retracts from the recess in the keyboard, and the damping device may then be manually operated to eject the keyboard from the enclosure.

DETAILED DESCRIPTION OF THE PREFERRED EMBODIMENT

Figure 1:
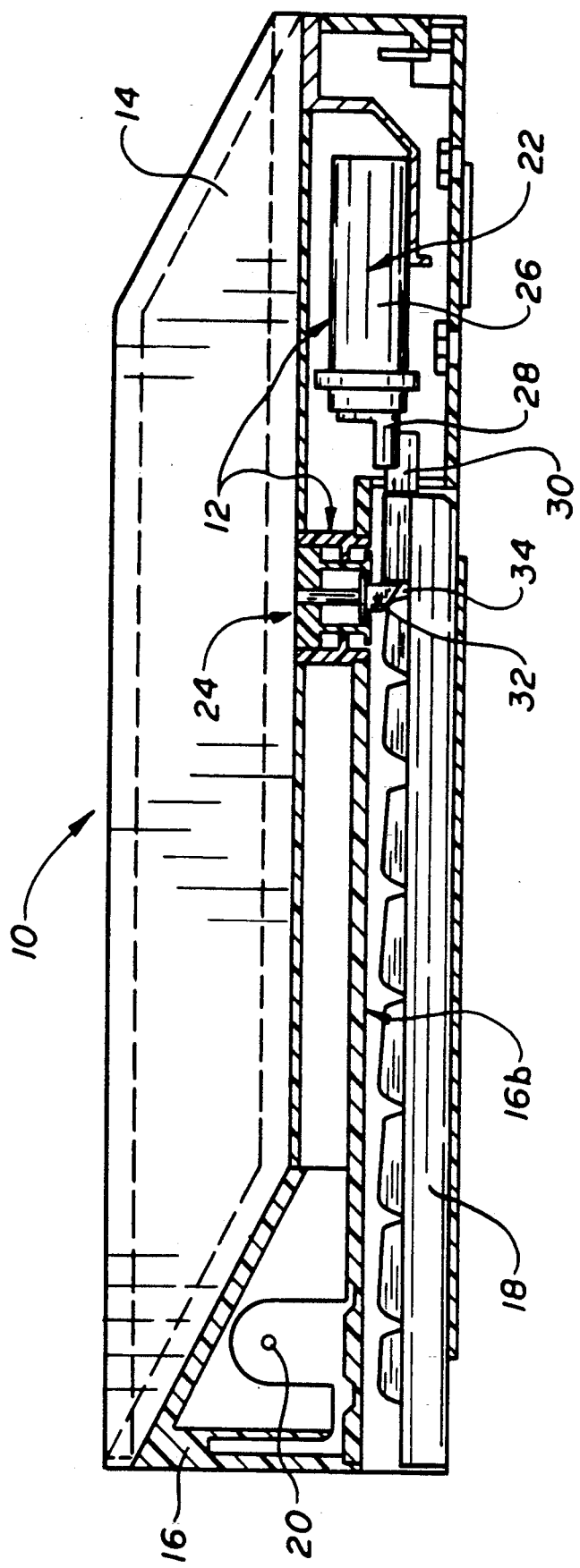
FIG. 1 is a sectional side view of a computer into which the keyboard storage and retrieval system of the present invention is incorporated, the keyboard being shown in a stored and locked position.

FIG. 1 shows a laptop computer 10 in which the keyboard storage and retrieval system 12 of the present invention is implemented. Specific laptop computers in which the invention may be implemented are IBM ® laptop computer models ThinkPad 700C ™ and ThinkPad 700 ™. Although the keyboard storage and retrieval system 12 is shown incorporated into a laptop computer, the invention may also be implemented in other types of computers using keyboards, for example, desktop computers. It is also contemplated that the invention may be implemented in either pen-based or non pen-based systems, although the invention provides additional benefits when implemented in a pen-based system, as will be further explained herein.

In addition to the keyboard storage and retrieval system 12, the laptop computer 10 shown in FIG. 1 comprises a flat panel display 14, an enclosure 16 and a removable keyboard 18. In the preferred embodiment, the flat panel display 14 also includes the laptop computer processing circuitry, comprising a combined tablet/display computer. The flat panel display 14 is attached to the enclosure 16 by means of a hinge 20, although other means of attaching the flat panel display to the enclosure are contemplated. The removable keyboard 18 is slidably attached to a bottom portion 16b of the enclosure 16 by means of slide rails.

The keyboard storage and retrieval system 12 comprises a manually operated damping device 22 and a manually operated mechanical latching device 24. The damping device 22 is used to eject the removable keyboard 18 from the enclosure 16. The latching device 24 is used to secure the removable keyboard to the enclosure. Alternatively, the keyboard storage and retrieval system 12 may comprise an electrical servomechanism.

The damping device 22 comprises a cylinder 26, a piston rod 28 contained within and extendable from the cylinder 26, and an offset piston rod extension 30. The piston rod extension 30 is offset with respect to the piston 28 so as to contact an edge of the removable keyboard 18. In this manner, the piston rod is able to eject the removable keyboard from the bottom portion 16b of the enclosure 16 when the piston rod is fully extended.

The damping device 22 in the preferred embodiment is the piston-cylinder type damper disclosed in U.S. Pat. No. 4,629,167 to Kimura, et al. and assigned to Nifco, Inc., of Yokohama, Japan, the text of which U.S. patent is incorporated herein by reference. The damping device 22 is attached within the enclosure by conventional means. The damping device includes a coil spring (not shown) disposed between the interior end of the piston and the end wall of the cylinder, and a check valve damping means disposed within a hollow cavity portion of the piston for controlling the inward and outward movement of the piston relative to the cylinder. The damping device 22 is a two position device, such that when the piston 28 is depressed fully into the cylinder and released a first time, the piston extends outwardly to a first position (corresponding to the piston positions shown in FIGS. 1 and 2). When the piston 28 is depressed fully into the cylinder and released a second time, the piston extends further outward to a second position. This preferred damping device is the same type of damping device used in compact disc ejection mechanisms in compact disc players.

As shown in FIG. 1, the manually operated damping device 22 is prevented from ejecting the removable keyboard 18 from the enclosure 16, because the mechanical latching device 24 has locked the keyboard in its stored position. A locking pin 32 extending from the latching device 24 mates with a recess 34 in the keyboard to prevent ejection of the keyboard whenever the flat panel display 14 is in the closed position shown in FIG. 1.

Figure 2:
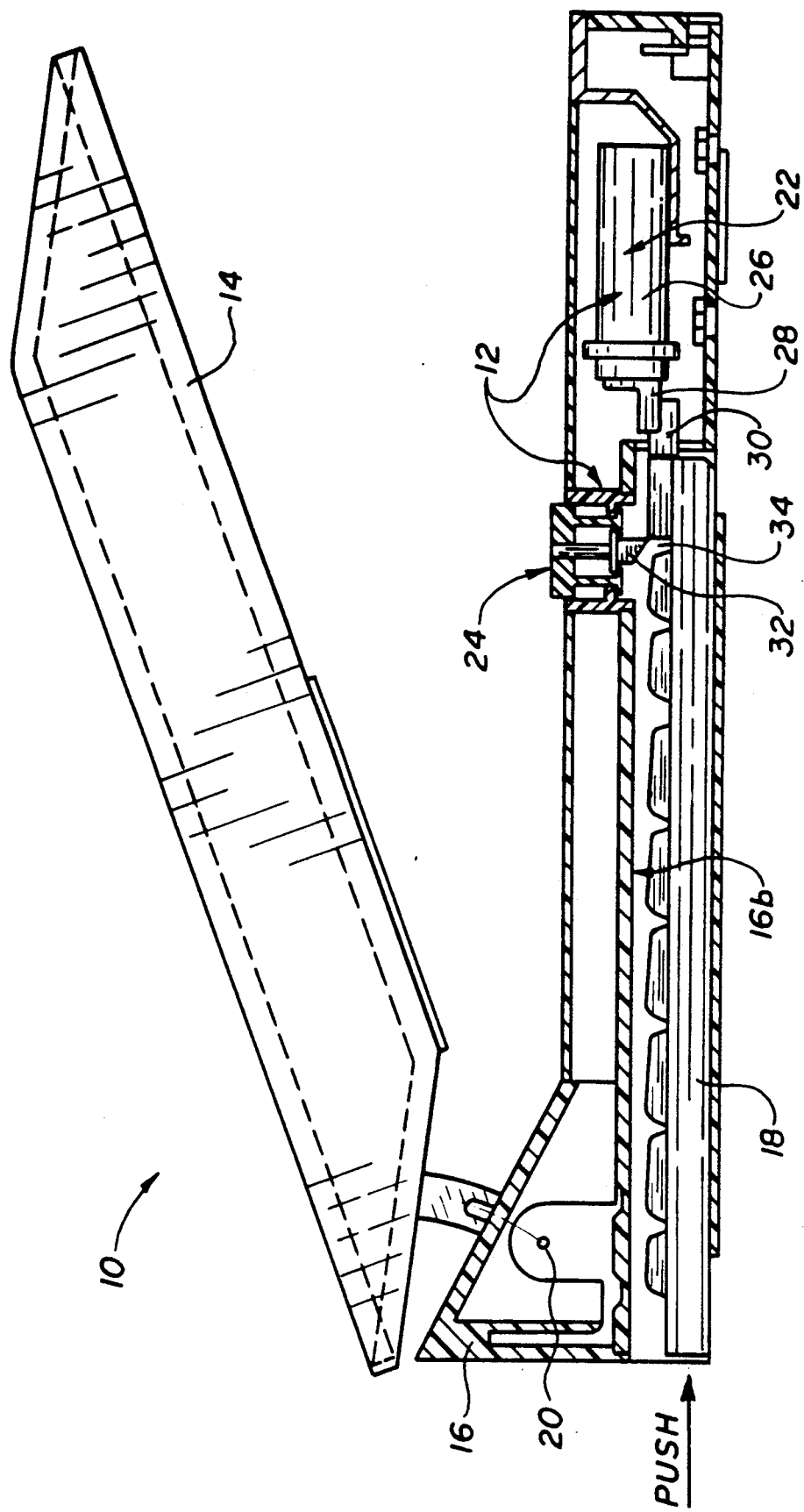
FIG. 2 is a sectional view of the computer of FIG. 1 in which the keyboard is shown in a stored and unlocked position.

As shown in FIG. 2, however, the damping device is not inhibited from ejecting the removable keyboard from the enclosure, because the keyboard is in a stored but unlocked position. With the flat panel display in the open position shown in FIG. 2, the locking pin 32 retracts from the recess 34 in the keyboard, and the damping device 22 may be manually operated to eject the keyboard from the enclosure, as will be further explained below.

Figure 3A:
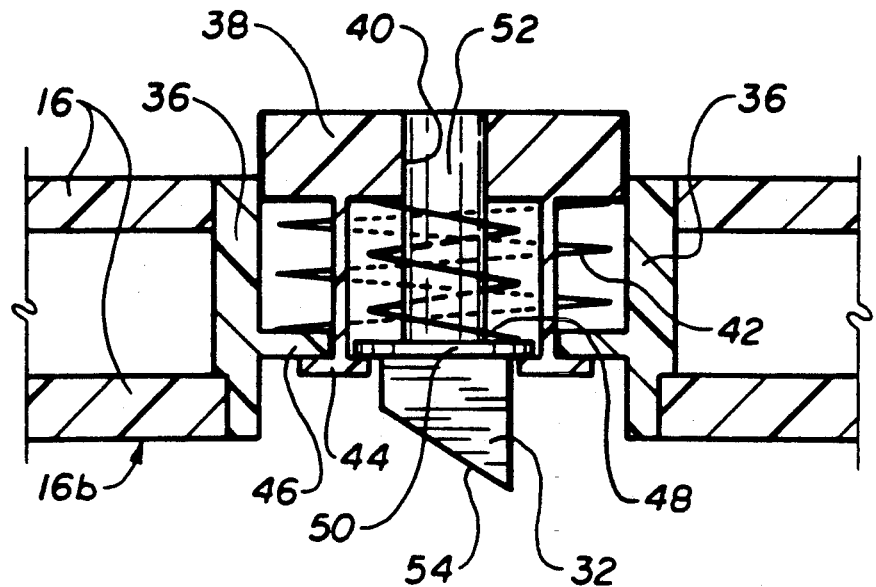
FIGS. 3A and 3B are sectional views of the mechanical latching device forming part of the keyboard storage and retrieval system shown in FIG. 1.
Figure 3B:
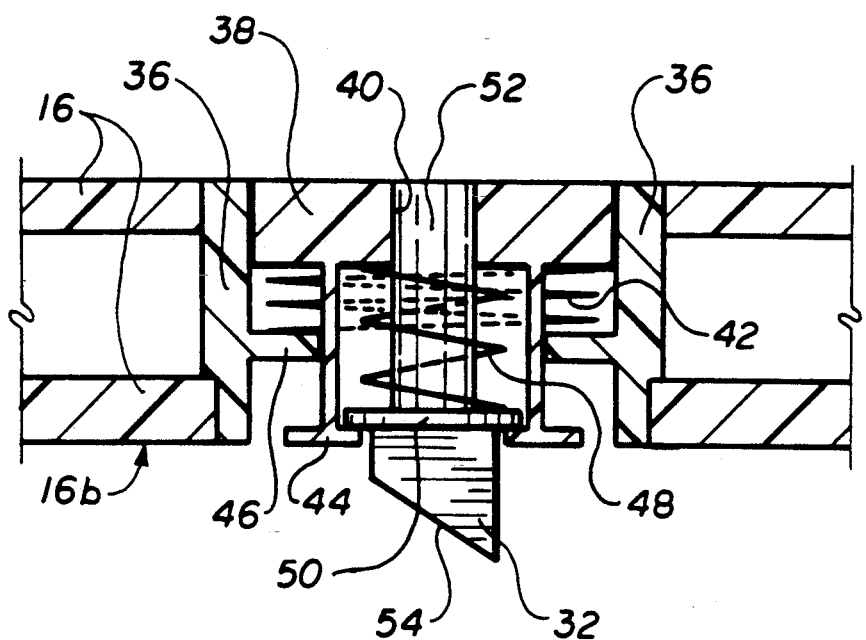

The latching device 24, which together with the damping device 22 form the keyboard storage and retrieval system 12 of the present invention, is shown in greater detail in FIGS. 3A and 3B. The latching device 24 comprises (i) a latching device housing 36 which is fixedly attached to the enclosure 16, (ii) a plunger 38 which is slidable within the latching device housing; and (iii) the locking pin 32 which is slidable within the plunger.

The plunger 38 as shown in FIG. 3A is in the same position as shown in FIG. 2. When the flat panel display 14 is in the open position (FIG. 2), the plunger 38 is biased upwardly by a spring 42. A flange 44 near the bottom of the plunger meets a stop 46 on the latching device housing 36 to prevent the plunger from separating from the enclosure 16. In the position shown in FIG. 3A, the locking pin 32 extends only a short distance below the bottom surface 16b of the enclosure 16, and the removable keyboard 18 may slide freely beneath the bottom portion 16b of the enclosure 16.

The plunger 38 as shown in FIG. 3B is in the same position as shown in FIG. 1. When the flat panel display 14 is in the closed position (FIG. 1), the plunger 38 is pushed downwardly, compressing the spring 42. In the position shown in FIG. 3B, the locking pin 32 extends further below the bottom surface 16b of the enclosure 16, effectively preventing the keyboard from being ejected from the enclosure 16 by the damping device 22 (see FIG. 1).

Just as the plunger 38 is movable within the latching device housing 36, the locking pin 32 is movable within the plunger 38 through a hole 40 in the plunger. A spring 48 normally biases the locking pin 32 downward with respect to the plunger. A collar 50 surrounding the shaft 52 of the locking pin 32 meets with an inwardly extending portion of the flange 44 near the bottom of the plunger 38 to prevent the locking pin from separating from the plunger.

As explained above, when the flat panel display 14 is in the open position (FIGS. 2 and 3A), even with the locking pin 32 in its normally downward position with respect to the plunger 38, the removable keyboard 18 may move freely beneath the locking pin 32. However, when the flat panel display is in the closed position (FIGS. 1 and 3B), the locking pin 32 in its normal downwardly biased position presents an obstacle to the movement of the removable keyboard which must be overcome to lock the keyboard in place.

When sliding the keyboard into its stored position, with the flat panel display 14 in the closed position, the keyboard first meets an inclined surface 54 of the locking pin 32. By gently pushing the keyboard forward into the enclosure 16, the locking pin 32 is urged upward with respect to the plunger 38, compressing spring 48. By continuing to gently push the keyboard forward, the keyboard meets and then pushes the piston rod extension 30 forward, driving the cylinder rod 28 to which it is attached into the cylinder 26 until the locking pin 32 aligns with the recess 34 in the keyboard 18. At this point the spring 48 urges the locking pin 32 downwardly into the recess 34, effectively locking the keyboard in place. The piston at this point is in its first position (corresponding to the piston positions shown in FIGS. 1 and 2).

Figure 4:
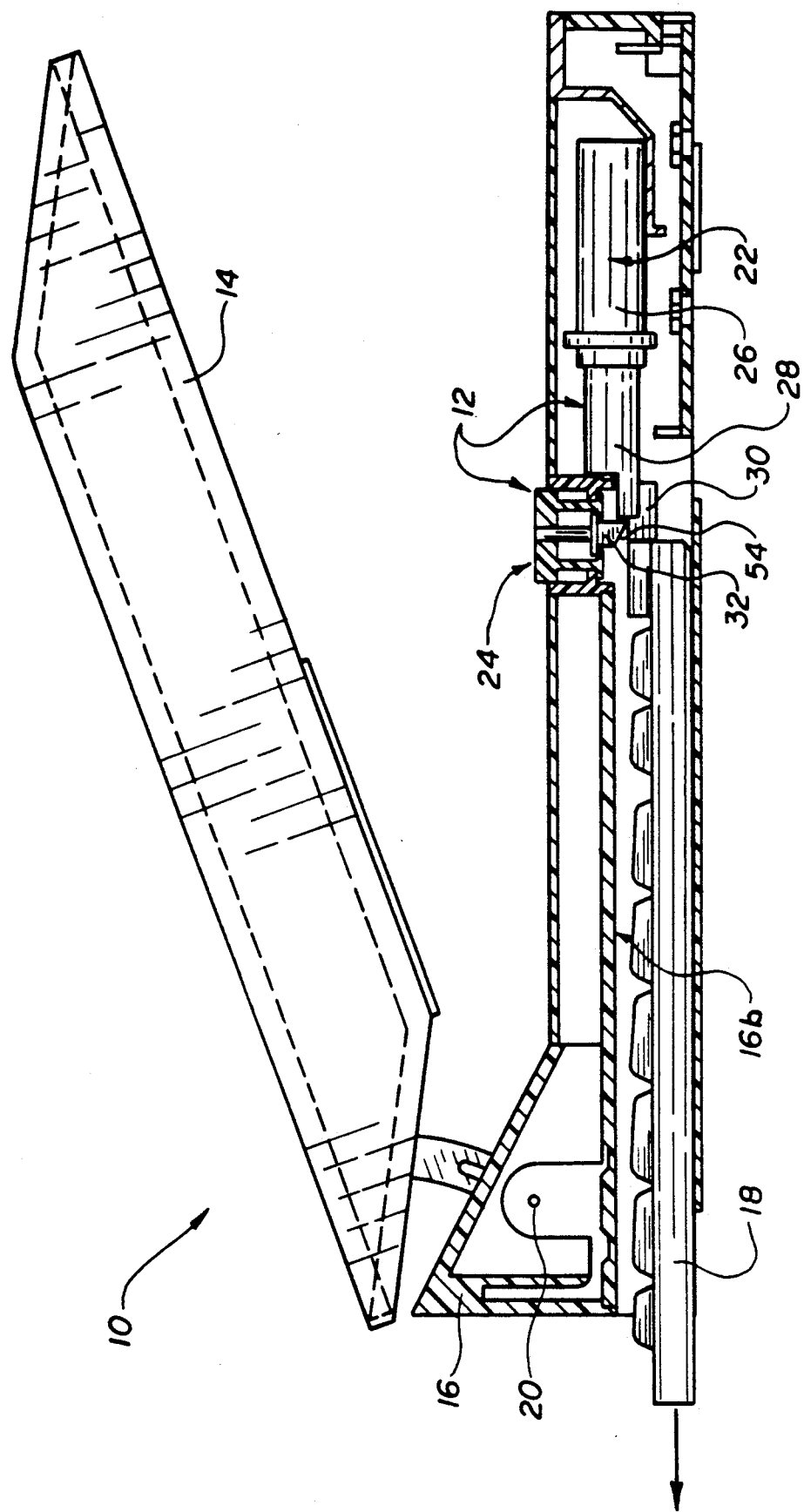
FIG. 4 is sectional view of the computer of FIG. 1 in which the keyboard is shown in a partially removed and unlocked position.

If the computer flat panel display 14 is then lifted into an open position, the removable keyboard may be ejected using the damping device 22. By pushing on the keyboard, thereby depressing the piston 28 fully into the cylinder 26, the piston will extend to a second position as shown in FIG. 4. Although the keyboard will not be fully ejected, at least a portion of the keyboard will be able to be grasped by a user and fully removed from the enclosure (see FIG. 5). If, however, the flat panel display remains in the closed position, the action of the damping device 22 will be inhibited by the locking pin 32 and the keyboard can not be removed from the enclosure.

Figure 5:
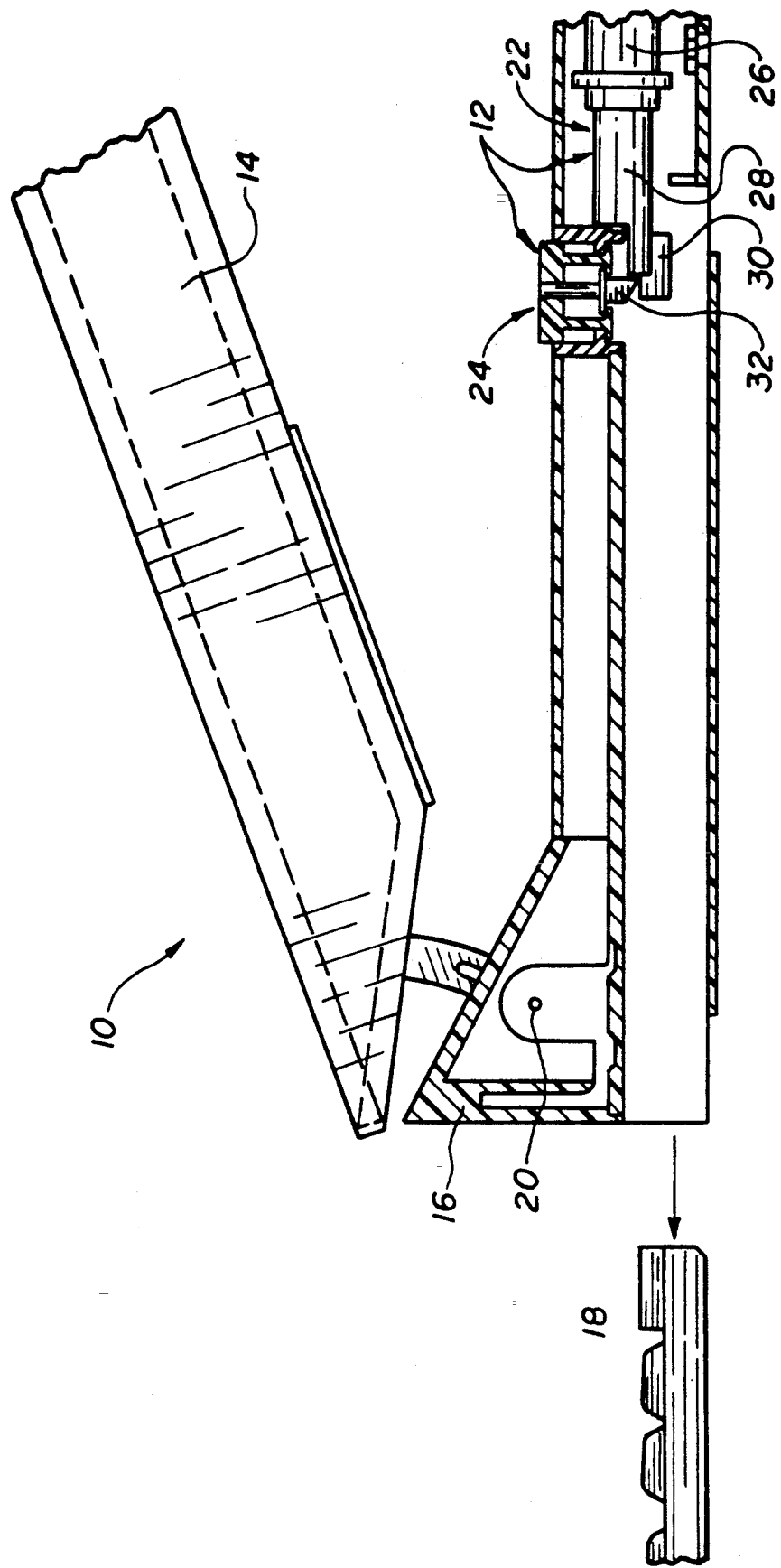
FIG. 5 is a fragmentary sectional view of the computer of FIG. 1 in which the keyboard is shown in a completely removed and unlocked position.

FIG. 5 shows the removable keyboard 18 completely removed from the enclosure 16. As shown in FIG. 5, the keyboard is a wireless keyboard which is completely detachable from the enclosure and which uses infrared signals to communicate with the laptop computer 10. Of course conventional keyboards connected to the computer via cable are also contemplated.

As explained above, the invention may be implemented in either pen-based or non pen-based computer systems. If implemented in a pen-based system, however, the removability of the keyboard provides an added benefit. In pen-based systems, the removable keyboard may be completely stored out of the way of the flat panel display, thereby presenting the user operating a stylus with easier access to the flat panel display.

Accordingly, the preferred embodiment of an improved keyboard storage and retrieval system for a laptop computer having a removable keyboard has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A laptop computer having an ejectable keyboard, comprising:
   a laptop enclosure;
   an ejectable keyboard slidably contained within said laptop enclosure; and
   a latching system for lockingly securing said ejectable keyboard within said laptop enclosure, said latching system including a damping device for ejecting said ejectable keyboard from within said enclosure and a mechanical latching device for securing said ejectable keyboard within said enclosure.

2. The system of claim 1, wherein said damping device for ejecting said ejectable keyboard from said enclosure and said mechanical latching device for securing said ejectable keyboard within said enclosure are manually operated.

3. The system of claim 2, wherein said laptop computer includes a flat panel display which is movable to a closed position on said enclosure to actuate said latching device to prevent said damping device from ejecting said ejectable keyboard from said enclosure.

4. The system of claim 3, wherein handwritten messages may be written onto said flat panel display via a stylus and recognized by said laptop computer.

5. The system of claim 3, wherein said flat panel display is hingedly attached to said enclosure.

6. The system of claim 3, wherein said ejectable keyboard is attached to the laptop computer via a cable.

7. The system of claim 3, wherein said wherein said ejectable keyboard is completely detachable from said enclosure, using infrared signals to communicate with the laptop computer.

8. The system of claim 2, wherein said latching device includes (i) a latching device housing which is fixedly attached to said enclosure; (ii) a plunger which is slidable within said latching device housing; and (iii) a locking pin which is slidable within said plunger to engage a corresponding recess in said ejectable keyboard to secure said keyboard within said enclosure.

9. The system of claim 8, wherein said plunger is biased against said latching device housing by a spring, and said locking pin is biased against said plunger by a spring.

10. A computer having an ejectable keyboard, comprising:
    an enclosure;
    an ejectable keyboard slidably contained within said enclosure; and
    a latching system for lockingly securing said ejectable keyboard within said enclosure, said latching system comprising a manually operated damping device for ejecting said ejectable keyboard from within said enclosure and a manually operated mechanical latching device for securing said ejectable keyboard within said enclosure.

11. The system of claim 10, wherein said computer includes a flat panel display which is movable to a closed position on said enclosure to actuate said latching device to prevent said damping device from ejecting said ejectable keyboard from said enclosure.

12. The system of claim 11, wherein handwritten messages may be written onto said flat panel display via a stylus and recognized by said computer.

13. The system of claim 11, wherein said flat panel display is hingedly attached to said enclosure.

14. The system of claim 11, wherein said ejectable keyboard is attached to the computer via a cable.

15. The system of claim 11, wherein said wherein said ejectable keyboard is completely detachable from said enclosure, using infrared signals to communicate with the computer.

16. The system of claim 10, wherein said latching device includes (i) a latching device housing which is fixedly attached to said enclosure; (ii) a plunger which is slidable within said latching device housing; and (iii) a locking pin which is slidable within said plunger to engage a corresponding recess in said ejectable keyboard to secure said keyboard to said enclosure.

17. The system of claim 16, wherein said plunger is biased against said latching device housing by a spring, and said locking pin is biased against said plunger by a spring.

18. A pen-based computer having an ejectable keyboard, comprising:
    an enclosure;
    a stylus;
    a flat panel display onto which handwritten information is written and recognized by the computer;

an ejectable keyboard slidably contained within said enclosure; and a latching system for lockingly securing said ejectable keyboard to said enclosure, said latching system including a damping device for ejecting said ejectable keyboard from within said enclosure and a mechanical latching device for securing said ejectable keyboard within said enclosure.

19. The system of claim 18, wherein said damping device for ejecting said ejectable keyboard from said enclosure and said mechanical latching device for securing said ejectable keyboard within said enclosure are manually operated.

20. The system of claim 19, wherein said flat panel display is movable to a closed position on said enclosure to actuate said latching device to prevent said damping device from ejecting said ejectable keyboard from said enclosure.

21. The system of claim 20, wherein said ejectable keyboard is attached to the computer via a cable.

22. The system of claim 20, wherein said wherein said ejectable keyboard is completely detachable from said enclosure, using infrared signals to communicate with the computer.

23. The system of claim 19, wherein said flat panel display is hingedly attached to said enclosure.

24. The system of claim 19, wherein said latching device includes (i) a latching device housing which is fixedly attached to said enclosure; (ii) a plunger which is slidable within said latching device housing; and (iii) a locking pin which is slidable within said plunger to engage a corresponding recess in said ejectable keyboard to secure said keyboard to said enclosure.

25. The system of claim 24, wherein said plunger is biased against said latching device housed by a spring, and said locking pin is biased against said plunger by a spring.

* * * * *